United States Patent
Sanford et al.

(10) Patent No.: US 8,072,670 B2
(45) Date of Patent: Dec. 6, 2011

(54) PIXEL CIRCUIT TO ELECTRODE TRANSLATION

(75) Inventors: James L. Sanford, Camas, WA (US); Howard V. Goetz, Tigard, OR (US); Steven H. Linn, Hillsboro, OR (US)

(73) Assignee: Compound Photonics Limited, Phoenix, AZ (US)

( * ) Notice: Subject to any disclaimer, the term of this patent is extended or adjusted under 35 U.S.C. 154(b) by 21 days.

(21) Appl. No.: 11/350,706

(22) Filed: Feb. 9, 2006

(65) Prior Publication Data
US 2007/0247695 A1 Oct. 25, 2007

(51) Int. Cl.
*G02F 1/03* (2006.01)
(52) U.S. Cl. ........................................................ 359/254
(58) Field of Classification Search .................. 359/240, 359/245, 239, 237–238, 290–291, 254, 295; 349/25, 30; 345/55, 84
See application file for complete search history.

(56) References Cited

U.S. PATENT DOCUMENTS

| | | | |
|---|---|---|---|
| 6,091,463 A * | 7/2000 | Robinson et al. | 349/25 |
| 6,330,099 B1 * | 12/2001 | Sojourner et al. | 359/254 |
| 6,654,156 B1 * | 11/2003 | Crossland et al. | 359/290 |
| 2002/0041264 A1 * | 4/2002 | Quanrud | 345/55 |
| 2004/0196524 A1 * | 10/2004 | Hughes et al. | 359/244 |
| 2005/0128193 A1 * | 6/2005 | Lueder | 345/207 |
| 2005/0156839 A1 * | 7/2005 | Webb | 345/87 |
| 2006/0145973 A1 * | 7/2006 | Jin | 345/84 |
| 2007/0064008 A1 * | 3/2007 | Childers | 345/589 |

FOREIGN PATENT DOCUMENTS
WO PCT/US2005/018305 5/2005
WO WO 2005116719 A2 * 12/2005

* cited by examiner

*Primary Examiner* — Scott J Sugarman
*Assistant Examiner* — Mahidere Sahle
(74) *Attorney, Agent, or Firm* — McKenna Long & Aldridge, LLP.

(57) ABSTRACT

A spatial light modulator has an array of elements organized into element rows and element columns and an array of electrodes organized into electrode rows and electrode columns to activate the array of elements. The modulator has pixel circuitry organized into circuit rows and circuit columns with the pixel circuitry being electrically coupled to the array of electrodes, such that there is at least one translation of either circuits in a column to electrodes in a row or circuits in a row to electrodes in a column.

17 Claims, 6 Drawing Sheets

PIXEL CIRCUIT TO ELECTRODE TRANSLATION

BACKGROUND

Many recently developed projection display systems use spatial light modulators to directly produce the display image. Spatial light modulators are generally formed as an array of X by Y elements. The elements may be physical elements, such as in liquid crystal displays (LCDs), or may be a region of an imaging surface that is activated by a particular addressing scheme. In active matrix displays, the circuitry that activates the element or the region is referred to here as the pixel circuit.

The physical design of digital pixel circuits is generally rectangular in shape when the area of the pixel circuit is minimized. Generally, in high resolution projection displays, it is desirable that the picture elements (pixels) be square. To make a square pixel with a rectangular shaped pixel circuit, the pixel pitch becomes the long dimension of the pixel circuit. This results in pixel circuit area that is not utilized, and pixels that are larger than would otherwise be possible, both adding to the expense of the spatial light modulator In some systems, lenses are used to magnify the image on the face of the spatial light modulator. In these types of systems, it may be advantageous to have a spatial light modulator with a pixel pitch that is as small as possible. This may be hampered by the pixel circuitry minimization as discussed above.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
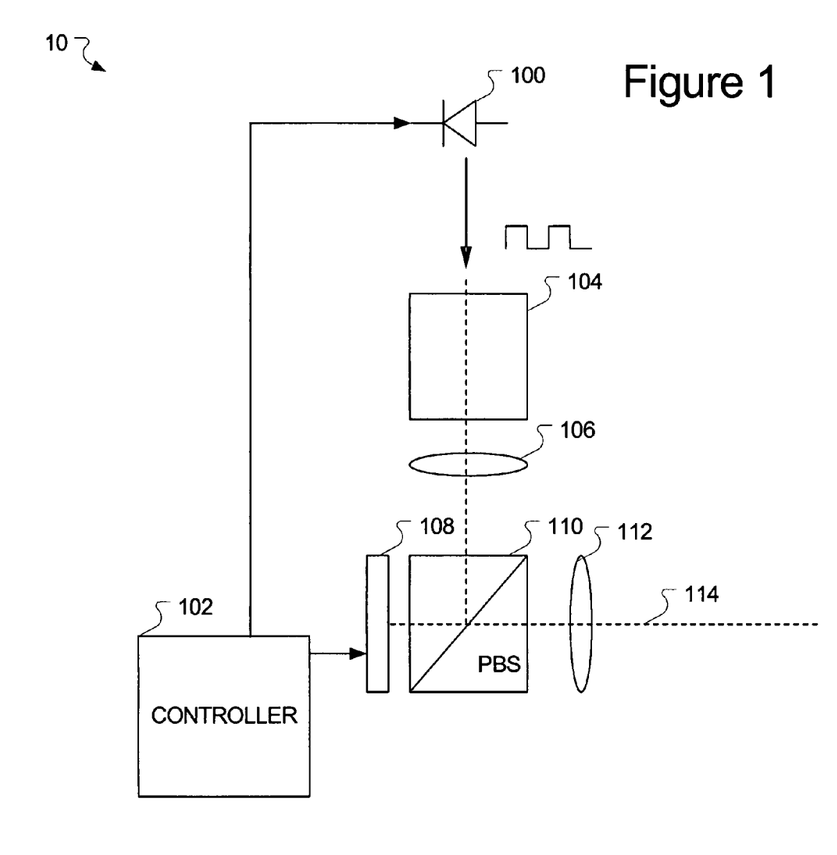
FIG. 1 shows an embodiment of a display system.

FIG. 1 shows an embodiment of a display system 10 using a spatial light modulator. A light source 100 provides visible light to the first spatial light modulator 108. The light source 100, in one embodiment is a light-emitting diode (LED) but could also be any of a number of different light sources including a UHP (ultra high pressure lamp) as is commonly used in the industry. The light from the first light source travels through a light tunnel 104 and an imaging lens 106 to the polarizing beam splitter (PBS) 110.

The s polarization of the light is then reflected by the polarizing beam splitter 110 to the spatial light modulator 108. The spatial light modulator 108 then reflect a p polarized image back through the polarizing beam splitter 108 through lens 112 along path 114 for creating a magnified image.

Figure 2:
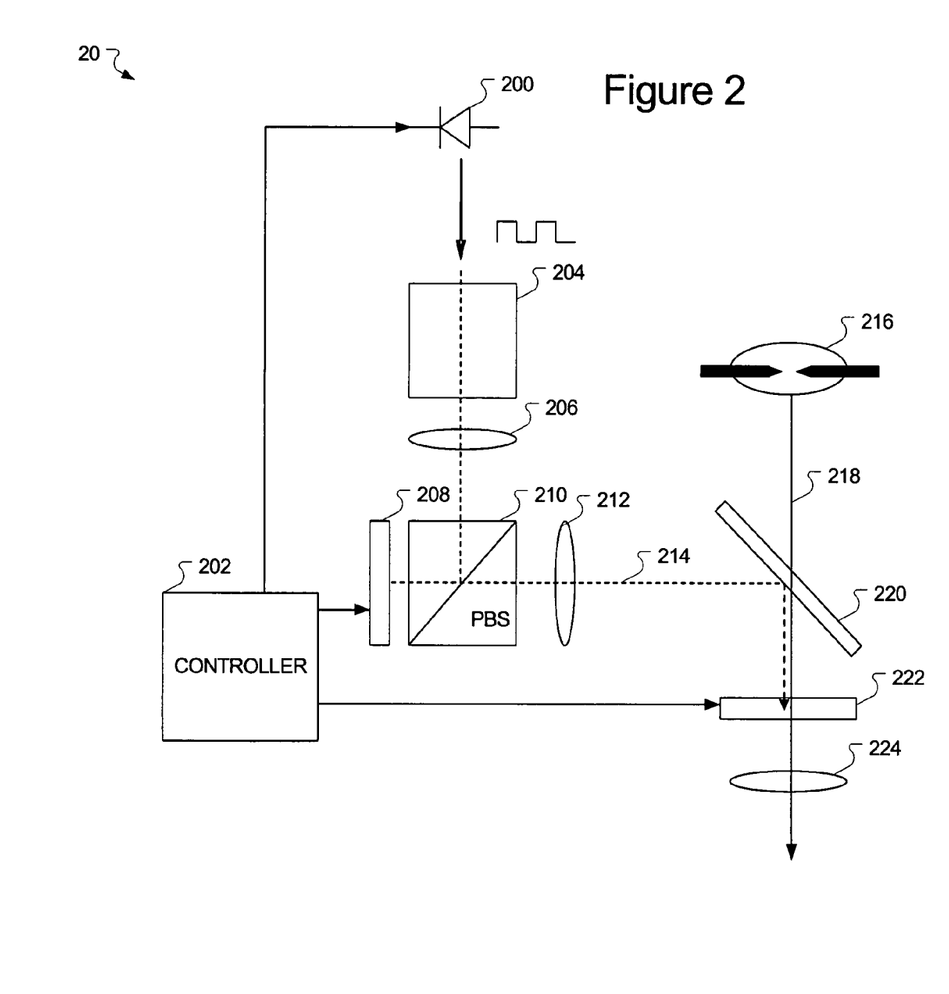
FIG. 2 shows an alternate embodiment of a display system.

FIG. 2 shows an alternative embodiment of a display system 20 using two spatial light modulators. Various system configurations may be found in International Patent Application No. PCT/US2005/018305, titled, "Transmissive, Optically Addressed, Photosensitive Spatial Light Modulators And Color Display Systems Incorporating Same," filed May 24, 2005 and commonly owned by the assignee of the current application, incorporated by reference in it entirety here. A first light source 200 provides non-visible light to the first spatial light modulator 208. The light source 200, in one embodiment a light-emitting diode (LED), is pulsed by the controller 202 in a repeating pattern. The light from the first light source travels through a light tunnel 204 and an imaging lens 206 to the polarizing beam splitter (PBS) 210.

The s polarization of the light is then reflected by the polarizing beam splitter 210 to first spatial light modulator 208. The spatial light modulator 208 then reflects a p polarized image back through the polarizing beam splitter 210 through lens 212 along path 214 to dichroic mirror 220. The lamp 216, in one embodiment an arc lamp as shown, generates visible light along path 218, which passes through the dichroic mirror 220 and arrives at the second spatial light modulator 222. For reasons of simplicity, the polarizers and image forming optics for the visible light along path 218 are not shown.

Second spatial light modulator 222 may be a combination of photoconductor and liquid crystal. The photoconductor receives the image data as non-visible light such as ultraviolet light from the first spatial light modulator. Localized photoconductor illumination creates charge separation that increases the voltage applied across the liquid crystal cell resulting in modulation of the visible light from the lamp 216. The resulting visible image is then transmitted through an analyzer (not shown) and the projection lens 224 onto a display surface. Because the first spatial light modulator 'writes' the image onto the second, the first spatial light modulator 208 may be referred to as the write valve and the second spatial light modulator 222 may be referred to as the read valve.

One of the advantages of this system is that the etendue, a measure of the visible light throughput, is separated from the write valve allowing for a much smaller write valve and therefore lower system cost. In the system embodiment of FIG. 2, light source 200 may be a small emitting area solid state light source such as an LED or laser diode. The image written from the spatial light modulator 208 can be small, as it will generally be magnified by the lens 212. This allows the individual elements of the write value to be small relative to the read value individual elements without significantly affecting the etendue of the system. The smaller pixel write valves are lower in cost than larger pixel write valves.

The optical throughput for the visible light from the lamp 216 is determined by the size and transmission properties of the read valve. The etendue, a measure of an optical system to transfer power, is related to the solid angle subtended by the read valve to the source of the lamp. Larger read valves would provide higher etendue. Since the read valve is not patterned with electrodes or an active matrix backplane, the optical transmission is higher than for write valve only systems. The simple fabrication of the read valve also allows the read valve to be low in cost. As a result, the write and read valve display system has the potential to be lower in cost than write valve only systems.

The controller 202 provides the image data in bit planes to the spatial light modulator 208. The illumination from the light source 200 is pulsed and a bit plane image propagates along path 214 through magnifying lens 212. The light source 200 is turned off between bit planes to allow spatial light modulator 208 to respond to a new bit plane of data, such that the second bit plane image 'follows' the first through the lens 214 in a sequential fashion. In this manner, the bit planes of image data are written at high rates to produce grey scale images for viewing or other purposes, such as transmission to the second spatial light modulator 222 by the first spatial light modulator.

In one embodiment, the spatial light modulator 208 is liquid crystal on silicon (LCOS), a reflective spatial light modulator. As discussed above, the modulator 208 can be made small, which is somewhat contrary to the typically nature of spatial light modulators for projection displays. Generally, the size of the modulator elements is maximized to increase throughput in the system. However, since the image data can be magnified before being viewed or utilized, the modulator 208 may be made very small. It must be noted that the display system of FIGS. 1 and 2 are merely given as an examples of a systems using a small spatial light modulator. Different display systems, as well as variations on the example, may have the same possibility and no intention of limiting the scope of the invention exists. The embodiments of the invention could be applied to any spatial light modulator or any combination of multiple spatial light modulators.

As mentioned previously, one limitation on manufacturing small spatial light modulators is the shape of the pixel circuitry in comparison with the shape of the elements that form the pixels of the image. A spatial light modulator may be organized into an array of elements, such as pixilated liquid crystal regions. Having a common electrode on the cover glass, the pixilated liquid crystal regions, are activated by an array of electrodes, each of which is activated by a pixel circuit in an array of pixel circuits. The arrays of pixel circuits, electrodes and elements have rows and columns.

It is generally desirable to have square pixels. The pixel electrical circuit design can be analog or digital. Analog pixel circuits may have a single transistor and a single storage capacitor. In the physical design, the shape of the storage capacitor may be modified to obtain a pixel circuit having square dimensions. The transistor dimensions, the amount of storage capacitance required and perhaps the required aperture ratio determine the pixel area and resulting pixel pitch. As such, there isn't any unused pixel circuit area with an analog pixel circuit as can be the case with digital pixel circuit designs where the pixel area has been minimized.

The use of digital circuits have several advantages over analog circuits in that the use of digital display data allows for much more robust processing of the image data and more robust image creation for high-information-content high-resolution displays, as well as faster imaging rates. Digital pixel circuit designs typically have multiple transistors. The function of the circuit may vary, including one or more data states, in serial or parallel order relative to the data input and the pixel electrode. Circuit designs may be static or dynamic. Dynamic designs use fewer transistors, which reduce the circuit dimensions, but must be refreshed to maintain the logic states.

Most digital backplane designs use complementary metal-oxide semiconductor (CMOS) transistors of either n-type (NMOS) and p-type (PMOS). One dimension of the pixel circuit is generally defined by the minimum transistor width and the spacing between the NMOS and the PMOS transistors. Adjacent pixel circuits may share N and P wells for compactness. The other pixel circuit dimension is generally determined by the number of transistors in the circuit. Drain and source diffusions may be shared by transistors as appropriate. The wiring for power, ground and control signals may also impact the pixel circuit dimensions. In general, the most area efficient physical design or layout of the pixel circuit is rectangular, not square.

As it is desirable for the elements forming the pixels of the image to be square, and they have to 'cover' the pixel circuit, typically this results in the long dimension of the pixel circuit determining the size of the elements. The display element may become larger than is desired. With the pixel pitch determined by the pixel circuit long dimension, there is unused pixel circuit area resulting in an area inefficient pixel or element design.

As an example, using 0.25 μm process design rules, the pixel circuit physical design dimensions for a circuit having eight transistors are 4.2 μm by 7.08 μm. Conventionally, this would dictate that the pixel pitch would be 7.08 μm. This results in over 40% of the pixel circuit area not being utilized in the silicon as shown by $((7.08^2-7.08\times4.2)/7.08^2)=0.41$, or 41%). The percent of unused circuit area is sufficiently large as to be a cost problem. A solution is needed to eliminate this form of unused pixel circuit area. Application of embodiments of this invention almost eliminates this unused area, allowing the spatial light modulator to be smaller and cost less.

It should be noted that it is possible to use row and column wiring channels to correct for the mismatch of pixel circuit dimensions of a tightly packed array to that of the pixel pitch dimensions. However, in practice for display systems where the number of array elements is quite large, the row and column circuit to electrode wiring would be very complex and would not be practical or economical to implement. To avoid such limits, such wiring is limited to arrays having a few hundred or a few thousand elements. The number of element depends upon the pixel circuit aspect ratio, the wiring channel pitch and the available number of wiring layers. Most displays today have several hundred thousand or even millions of array elements. So, the use of wiring channels is not a practical solution for high information content displays.

Figure 3:
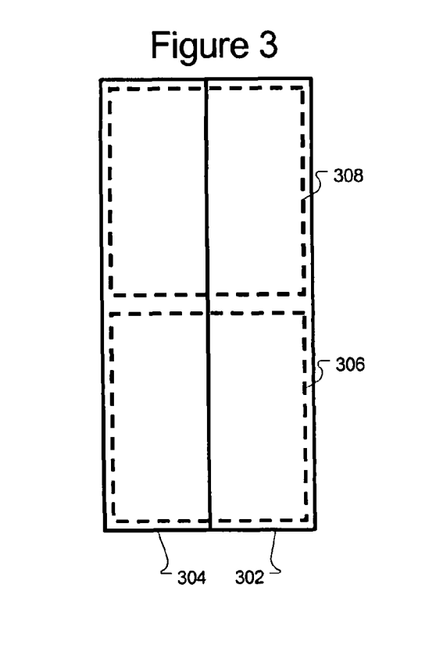
FIG. 3 shows an embodiment of translated pixel circuits and electrodes.

It is possible to alter the electrical connections underlying the pixel electrodes to allow the electrodes to be square and of smaller size than currently possible. Referring to FIG. 3, the physical design of two pixels, having two electrodes and two circuits is shown. Pixel circuits 302 and 304 have an aspect ration of 4:1; the length is 4 times the width. They abut each other along the long dimension and are in one row of two columns. Electrodes 306 and 308 are square and reside in one column of two rows. A minimum space lies between the electrodes to avoid electrical shorting.

The electrical connection for pixel circuit 302 is to pixel electrode 306, and the electrical connection for pixel circuit 304 is to pixel electrode 308. An additional level of interconnect wiring may be necessary to make these connections. As a result of this layout, the pixel circuit area is efficiently utilized by making the connection for a column positioned pixel circuit, 302 to a row positioned electrode 306.

Figure 4:
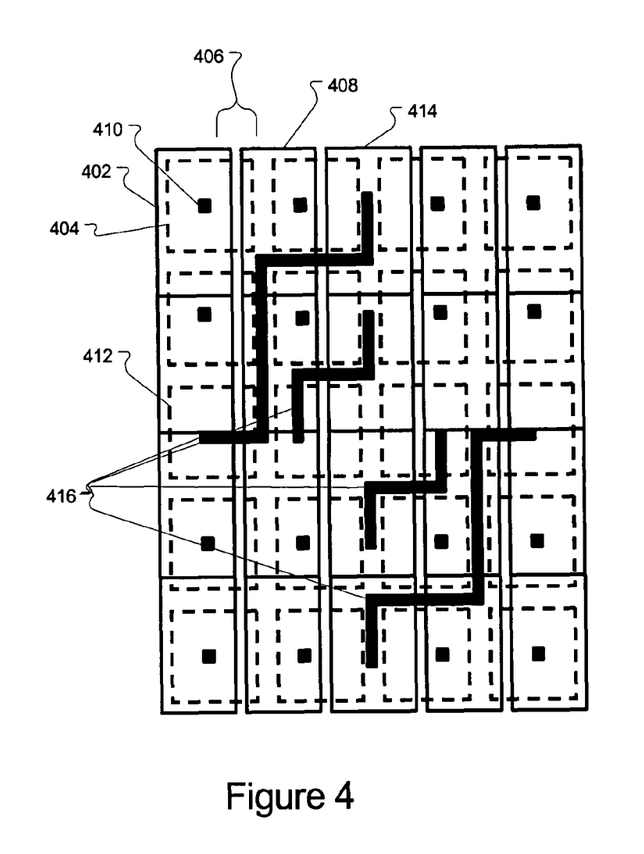
FIG. 4 shows an alternative embodiment of translated pixel circuits and electrodes.

It is possible to expand this approach, as shown in FIG. 4. The array shown may be a small subarray of a larger display array, having a 4 column by 5 row array of electrodes such as 404 and an array of 5 columns and 4 rows of pixel circuits such as 402. Space 406 between circuit 402 and circuit 408 is the remaining unused circuit layout area. Pixel circuit 402 is connected to electrode 404 by the connection 410. Pixel circuit column 414 is connected to pixel electrode row 412 by connections 416. The configuration of connections is left up to the system designer as there are 24 possible connection configurations, the connection configuration 416 merely being intended as an example.

Figure 5:
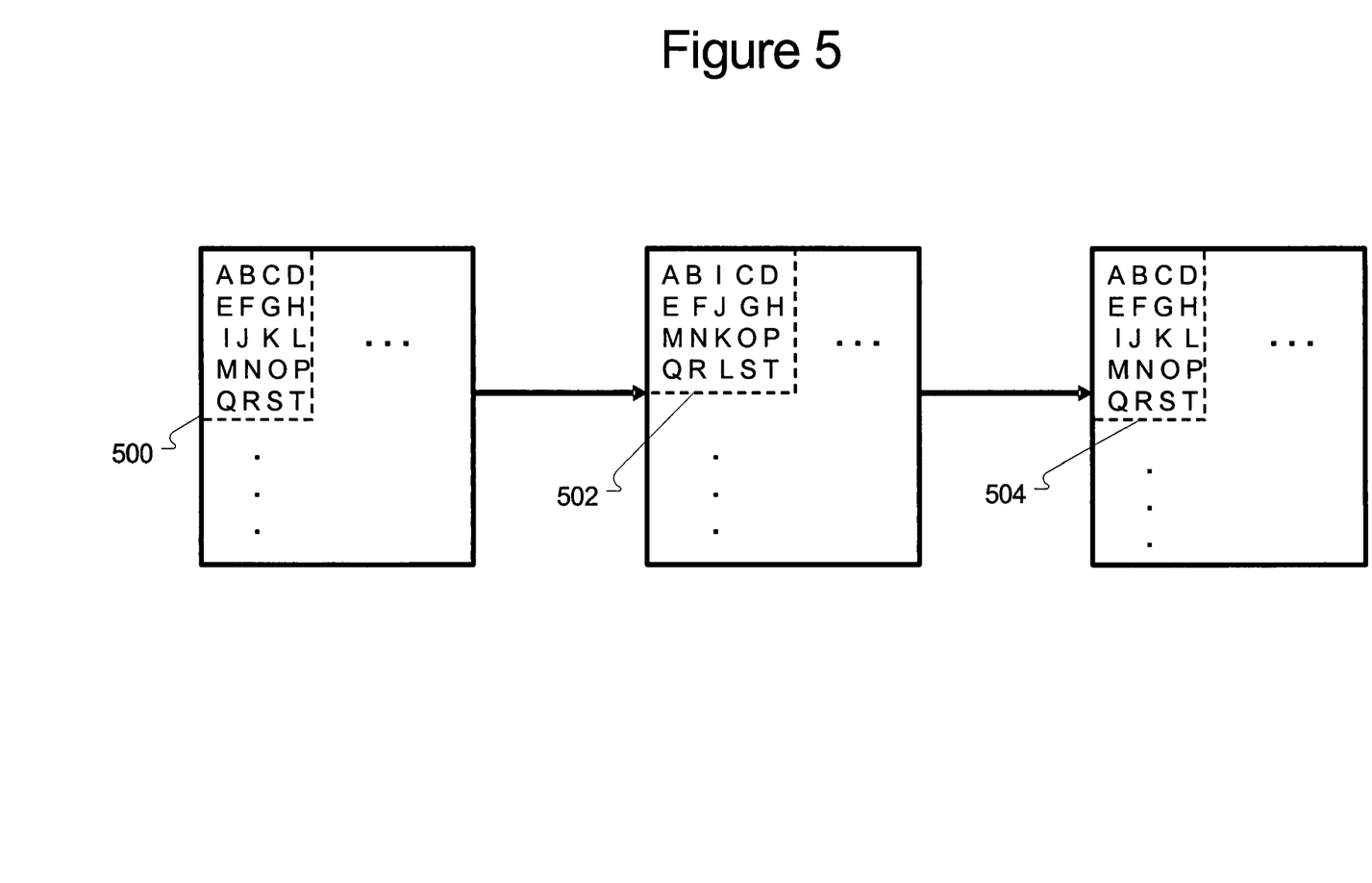
FIG. 5 shows an embodiment of a data translation in a display controller.

Since the outputs of a column of circuits are connected to row electrodes, the incoming circuit data must be adjusted. For the example in FIG. 4, the display controller 'pre-translates' the data such that when the translation occurs on the electrode array, the data is actually translated back to the original display data format. In FIG. 5, the display data is shown in its 'native' format of 5 rows and 4 columns at 500. The data is then translated at the display controller at 502 into 4 rows and 5 columns.

The display controller 'pre-translates' the third row of I, J, K, L data to the third column as shown in 502. Because of the third row translation that occurs in the sub-array shown in FIG. 4, the display translates the third column back into the third row of the displayed image data at 504. This allows the data to be displayed as originally intended, alleviating any translation artifacts that may otherwise have occurred in the image.

It is useful to develop some parameters for performing the translation from electrode rows, in FIG. 4, such as 412, to pixel circuit columns 414. It must be noted that pixel circuit rows may be translated with electrode columns as well. If M is the number of pixel circuit rows, and N is the number of pixel circuit columns, the number of electrode columns is O and the number of electrode rows is P. In order to be able to perform the translation(s), O must equal M and P must equal N, and there must be one pixel circuit for each electrode.

The circuit column width is less than the circuit column length. When an N by M array of pixel circuits are packed tightly over a nearly square area, N is greater than M, resulting in more pixel circuits in a row than there are pixel circuits in a column. The circuit width is less than an ideal pixel pitch, the square root of the pixel circuit area. The circuit length is greater than an ideal pixel pitch. If n is defined as being the number of columns of the pixel circuits swapped with a corresponding number of rows of the electrodes, then the correction to allow the pixel circuit array to have a similar layout shape as the electrode array having a pitch closer to the ideal pixel pitch is N−n=M.

It must be noted that this is for a circuit column to electrode row translation. It is entirely possible to switch columns of the electrodes with rows of the pixel circuits, with the dimensions being altered to match. The total number of circuits is N×M, and since M=N−n, the total can be expressed by N(N−n).

The pixel circuit dimensions depend upon the pixel circuit electrical design used. The aspect ratio of the pixel element may depend upon the desired aspect ratio for the display system. The area of the pixel may also depend upon the pixel circuit dimensions, the aperture ratio and the desired throughput of the system. The long pixel circuit dimension $L_2$ and the short pixel circuit dimension $L_1$ can be used to determine the aspect ratio of the pixel circuit, where $Ar=L_2/L_1$. One can use the aspect ratio to determine possible translations with the following relationships:

$$Ar \leq (N/(N-n)))^2 = ((M+n)M)^2 = (N/M)^2$$

or $$Ar \geq (N/(N-n)))^2 = ((M+n)M)^2 = (N/M)^2.$$

With the former relationship, a $\Delta L_2$, circuit to circuit spacing, is added in the $L_2$ direction to equalize the relationship. The unused pixel area is $\Delta L_2 L_1$. Or, with the latter relationship, a $\Delta L_1$, circuit to circuit spacing, is added to $L_1$ in the $L_1$ direction to equalize the relationship. The unused pixel area is $\Delta L_1 L_2$.

Figure 6:
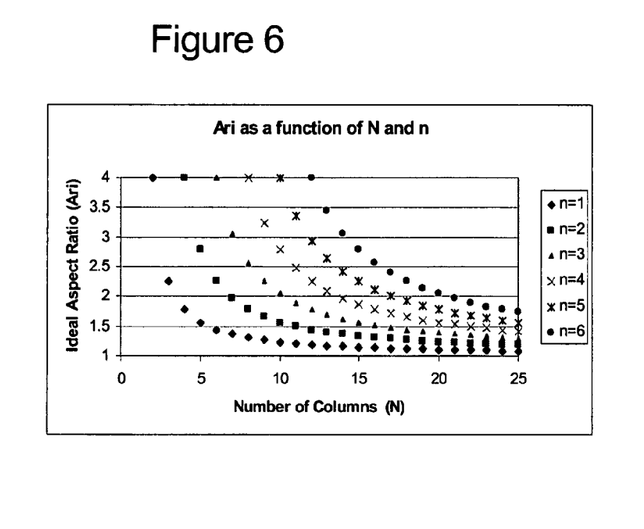
FIG. 6 shows a graph of aspect ratio compared to a number of translations.

A plot of the equalized or ideal aspect ratios design points, $Ari=(N/(N-n))^2$ as a function of the number of circuit columns, N, and the number of exchanges, n, is shown in FIG. 6. The data points depict translation arrangements for various aspect ratios that are possible. In practice, N and n are incremented to minimize the magnitude of Ar−Ari. The sign of Ar−Ari depends upon which pair of relationships applies.

Figure 7:
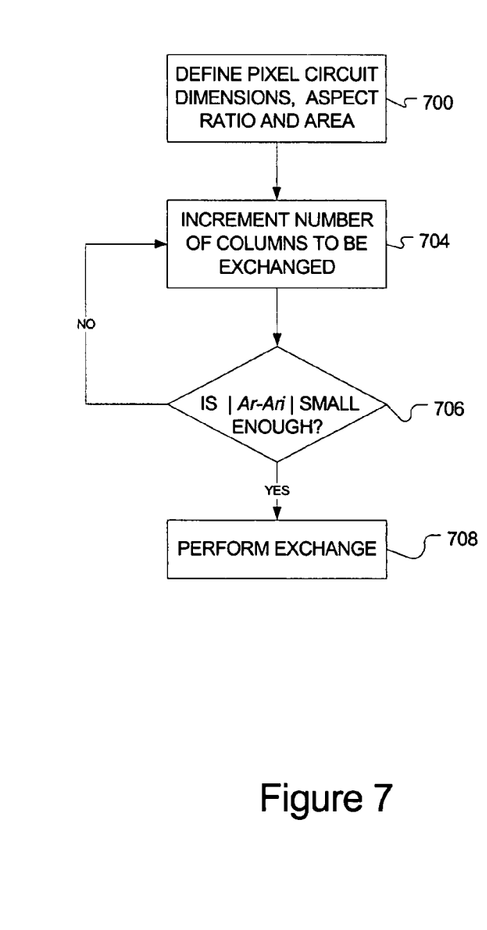
FIG. 7 shows an embodiment of a method to design a spatial light modulator.

It is possible to develop any rectangular circuit to electrode translation for minimizing unutilized area and obtaining a smaller pixel pitch. An embodiment of method of designing a circuit having the translated rows and columns is shown in FIG. 7. At 700, the pixel circuit dimensions, aspect ratio and the pixel area is determined. This process may also include determining a minimum pixel pitch. At 704, the N and n are incremented until |Ar−Ari| or the unused area is sufficiently small. The decision whether to increment n is shown at 706. N may also need to be incremented as n is increased.

The display controller data bus compatibility decision is also part of the decision shown at 706. The display controller has a data bus to memory and a data bus the display. The data bus width to the array should be equal to or greater than k*N where k is an integer. For the display controller to process the incoming data for translations in the array in FIG. 5, it may also be helpful if the memory bus width is equal to greater than to $k_1$*N(N−n) where $k_1$ is an integer. If the area is small enough and the design is compatible with the data bus width, the exchange shown at 708 can be performed.

An example illustrating data bus compatibility follows. The display controller memory data bus is 64-bits wide. Translating from 9 column and 7 rows of pixel circuits (N=9) to 7 columns and 9 rows of electrodes, k turns out to be 7 for a 63-bit wide data bus (N*k=9*7=63) and $k_1$=1*(N(N−n)= 9*7=63). A 63-bit wide data bus is very close to 64 bits, so only one data bus bit out of 64 bits of the display controller memory data bus is not used for sending data to the display. The display data is written into memory accordingly in order that all the image data is passed to the display.

Figure 8:
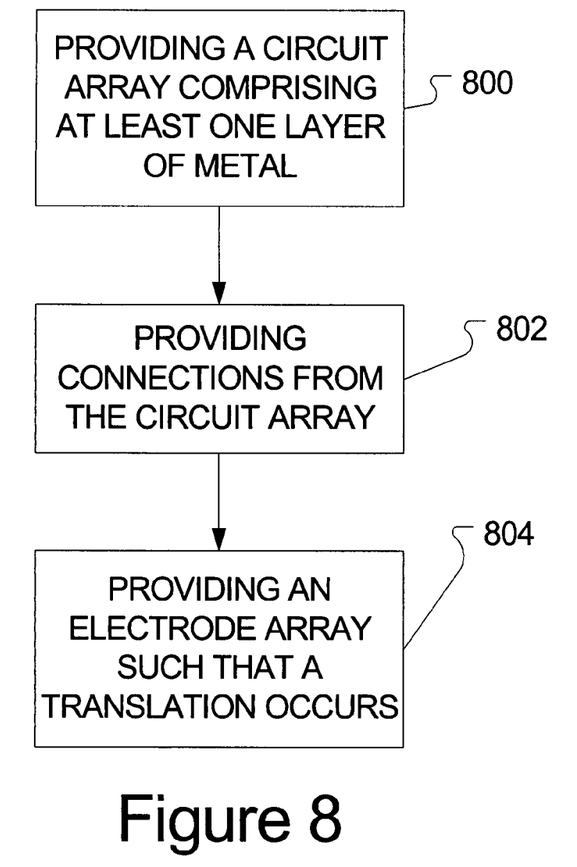
FIG. 8 shows an embodiment of a method to manufacture a spatial light modulator having translated pixel circuits and electrodes.

FIG. 8 shows an embodiment of a method of manufacturing a spatial light modulator having at least one translation between pixel circuits and electrodes. At 800, a pixel circuit array is provided, where the pixel circuits are arranged in rows and columns. In one embodiment, the pixels circuits are manufactured out at least one layer of metal. At 802, connections from the pixel circuit array are provided. At 803, the electrode array is provided in which the connections from the circuit array to the electrode array have at least one translation.

Variations on this basic process may also occur. For example with n>1, the connection lengths between the electrode array and the pixel circuit array may be reduced or shorter than would otherwise be possible with a one column to one row connection correspondence. Specifically, the adjacent circuits from two or more translation circuit columns could be connected to a single or the nearest row of translated electrodes.

In this example of minimizing connection lengths, the single column to a single row correspondence no longer exists but the overall correspondence between the number of circuit columns and electrode rows still does exist. The connection length is the length of the line that connects a given pixel circuit to its corresponding pixel electrode in the translation. A connection of minimum length here means that the pixel circuits and electrodes correspondence are specifically arranged to achieve the shortest length possible. Similarly, providing the connections may involve an additional layer of metal than what is used in forming the electrode array.

In addition, the area of the substrate 'covered by' or 'corresponding to' a given pixel circuit area is also minimized by the translation method. The translation method reduces the amount of 'wasted' substrate that is not utilized, making the design more efficient.

Thus, although there has been described to this point a particular embodiment for a method and apparatus a spatial light modulator having at least one pixel column or row translated to at least one electrode row or column, it is not intended that such specific references be considered as limitations upon the scope of this invention except in-so-far as set forth in the following claims.

What is claimed is:

1. A display system having an area-efficient spatial light modulator, comprising:
    first array of square pixel elements organized into M element rows and N element columns wherein the first array fits within a first footprint;
    second array of square electrodes organized into M electrode rows and N electrode columns to activate the array of elements wherein the second array fits within the first footprint;
    third array of rectangular pixel circuits overlying the array of pixel elements, the array of pixel circuits organized into an array of O rows of pixel circuits and P columns of pixel circuits, the number O being different from the number M and the number P being different from the number N, wherein the numbers N, M, O and P are integers and greater than 2; and
    a display controller that maps an M rows×N columns data into an O rows×P columns data, and provides the O rows×P columns data to the third array of rectangular pixel circuits,
    wherein the third array substantially overlies the first footprint, however, the third array of rectangular pixel circuits does not overlie the first array of square pixel elements in a one-to-one correspondence; and every pixel circuit is electrically coupled to a unique pixel element.

2. The area-efficient spatial light modulator of claim 1 wherein either at least one column of pixel circuits is electrically coupled to at least one row of electrodes, or at least one row of pixel circuits is electrically coupled to at least one column of electrodes.

3. The area-efficient spatial light modulator of claim 1 wherein O multiplied by P equals M multiplied by N.

4. The spatial light modulator of claim 1, the array electrode aspect ratio is one and the array pixel circuit aspect ratio is not equal to one.

5. The spatial light modulator of claim 1, the array consisting of a substantially minimum substrate area.

6. The spatial light modulator of claim 1, the lengths of the couplings between the array of pixel circuits to electrode are minimized.

7. A method of using the spatial light modulator of claim 1 to produce optical data for an optically addressed spatial light modulator.

8. The spatial light modulator of claim 1, wherein the third array of rectangular pixel circuits is located on a substrate, and wherein the spatial light modulator further comprises a plurality of subarrays located on the substrate.

9. The spatial light modulator of claim 1, the first array of square elements further comprising liquid crystal on silicon.

10. The spatial light modulator of claim 1, further comprising: a light source and a controller adapted to control the light source and the spatial light modulator, such that the spatial light modulator forms images from image data using the light source that are projected onto a display surface.

11. The spatial light modulator of claim 10, further comprising a liquid crystal on silicon modulator.

12. The spatial light modulator of claim 10, further comprising at least one magnifying lens.

13. The spatial light modulator of claim 10, wherein the display surface is an optically addressed light modulator having a second light source to form final images for display.

14. The spatial light modulator of claim 10, wherein the controller to translates either spatial light modulator data for a row of electrodes electrically coupled to a column of pixel circuitry or a column of electrodes electrically coupled to a row of pixel circuitry so that an image data output matches the original display data.

15. The spatial light modulator of claim 10, the light source further comprising a source of non-visible light.

16. The spatial light modulator of claim 10, the light source further comprising a source of visible light.

17. The spatial light modulator of claim 1, wherein the third array of rectangular pixel circuits is electrically coupled to the second array of square electrodes with interconnect wiring.

* * * * *